E. KLAHN.
COMPASS GYROSCOPE.
APPLICATION FILED DEC. 7, 1912. RENEWED OCT. 22, 1917.

1,289,813.

Patented Dec. 31, 1918.
2 SHEETS—SHEET 1.

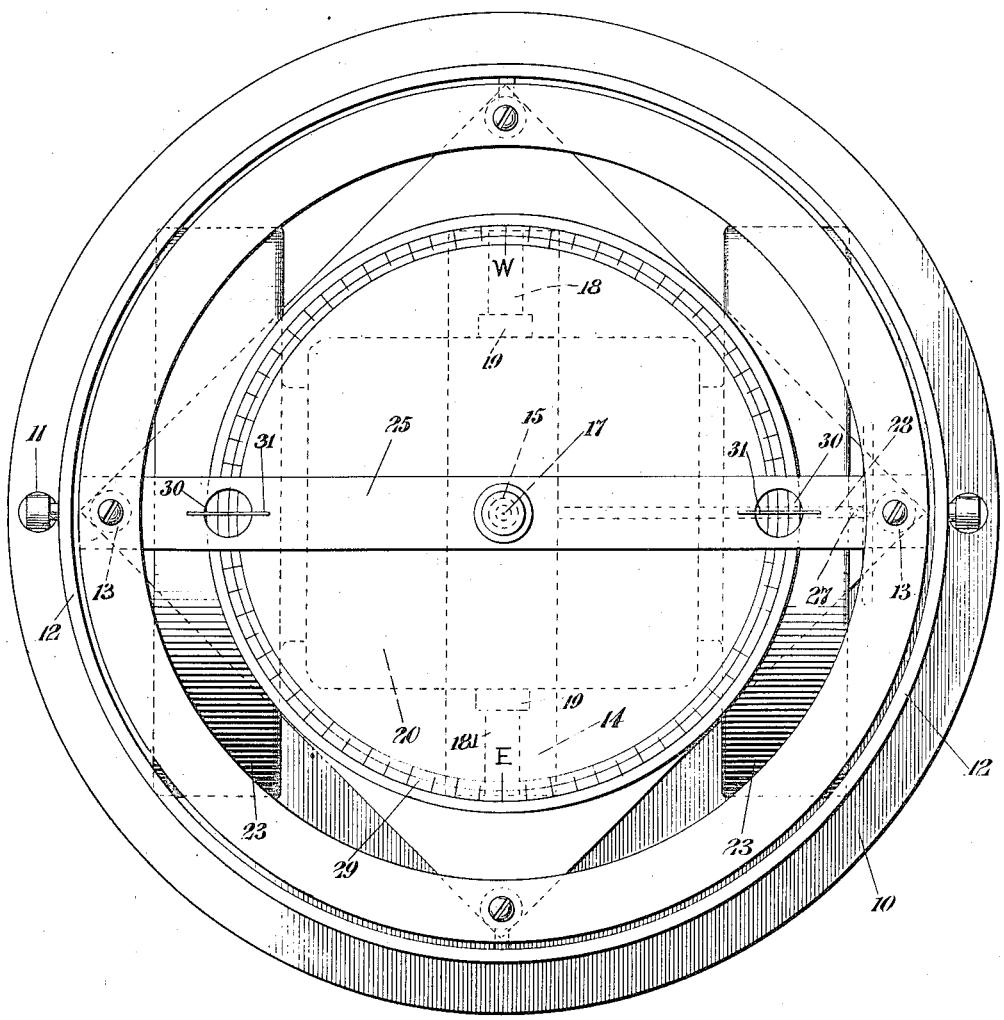

UNITED STATES PATENT OFFICE.

EMIL KLAHN, OF NEW VERNON, NEW JERSEY.

COMPASS-GYROSCOPE.

1,289,813.   Specification of Letters Patent.   Patented Dec. 31, 1918.

Application filed December 7, 1912, Serial No. 735,369.  Renewed October 22, 1917.  Serial No. 198,002.

*To all whom it may concern:*

Be it known that I, EMIL KLAHN, citizen of the United States, and a resident of New Vernon, in the county of Morris and State of New Jersey, have invented certain new and useful Improvements in Compass-Gyroscopes, of which the following is a specification.

The invention relates to an apparatus for maintaining the position of a member in a predetermined plane, relatively to the earth, irrespective of the movement of such member over the surface of the earth (change of latitude or longitude) and of the movement of the earth itself with respect to the said member.

To this end, the invention consists in so mounting the gyroscope that at all times it is unaffected by gravity, and in utilizing the potential function of such gyroscope to regulate the position of the controlled member when a disturbing force is acting on the gyroscope.

In the embodiment herein illustrated and described as one application of the invention, viz:—a non-magnetic compass—such disturbing or directive force results from the rotation of the earth and for movements and changes in the course of the vessel carrying the compass, an apparent rotation of the compass card or controlled member taking place and serving as a measure of the change in course.

In the accompanying drawings—

Fig. 2 is a plan thereof.

Similar characters of reference designate corresponding parts throughout the several views.

Figure 1:
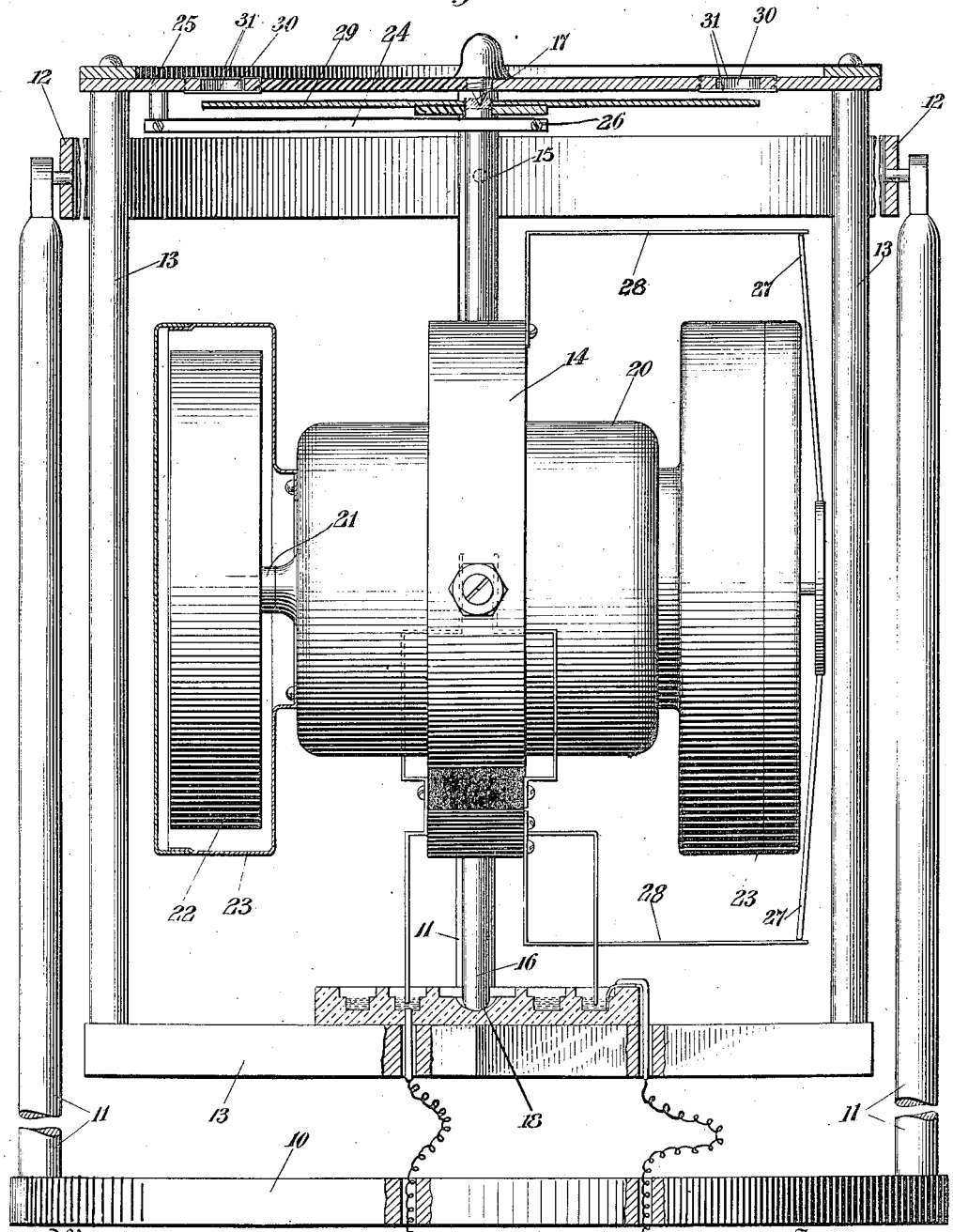
Figure 1 is a front elevation, partly in section, of a non-magnetic compass embodying the invention.

Referring to the drawings, 10 designates a suitable base for the apparatus, which base may be carried by a ship or other course changing body. Suitable columns 11 extend upwardly from the base and support a gimbal ring 12, which, in turn, is pivotally connected to the frame 13 of the apparatus proper, the mounting of frame 13 in the gimbal ring being according to the usual practice and intended to maintain the said frame 13 at all times in the plumb line.

The frame 13 retains a frame 14 rotatably mounted therein as by means of upper and lower shafts 15 and 16 forming an axle hereinafter referred to as the vertical axle of the gyroscope and rigidly connected with the frame 14, said shafts being held in corresponding bearings 17 and 18 respectively of the frame 13. Within the frame 14 is pivotally mounted as by trunnions 181, forming a horizontal axle of the gyroscope, in bearings 19, and at right angles to the said vertical axle, the gyroscopic member proper. This member comprises a motor 20 rotating an axle 21, at right angles to the said trunnions and the vertical axle, the axle 21 being hereinafter referred to as the axle of rotation of the rotating mass and driving two rotatable masses 22 at its respective ends. The masses 22 are shown inclosed in suitable casings 23 to avoid any disturbing action due to air currents produced by their rotation. The resistance to any torque which may act upon the vertical axle of the gyroscope is so adjusted as to be considerably greater than that offered by the trunnions 181, as will hereinafter be more fully set forth. To adjust the frictional resistance of the vertical axle, a tension band 24 is arranged about a portion of the shaft 15, one end of the said band being attached to a cross bar 25 at the top of the frame 13 and the other end being provided with an adjusting screw 26.

Extending from one end of the gyroscopic member are rods 27, one downwardly and the other upwardly, and each being substantially in contact with respective spring members 28 secured to the frame 14. These spring members are adapted to exert upon the said pivotally mounted gyroscopic member (axle 21) a slight upward and downward force respectively, insufficient to effect a rotation of the vertical axle of the gyroscope, but great enough to turn said axle 21.

The shaft 15 carries at its upper end the controlled member, which is herein shown, for the purpose of a non-magnetic compass, as a suitably graduated compass card or dial 29. Sight openings 30 are provided in the cross bar 25 and are fitted with two parallel, vertically disposed threads 31 to afford a more convenient and accurate reading of the graduations of said dial.

When a disturbing (external) force tending to alter the position of the controlled or indicating member is introduced, such as is caused by the rotation of the earth or as in a turning or change in course of the ship, a torque is applied to the vertical axle. The friction offered by this axle should be great enough to cause movement of the same with its frame 13 (when the gyroscope masses are not rotating) under action of a torque of such magnitude as would actually be present during operation, and should be greater than that in the trunnions 181. A torque acting upon the vertical axle is thus immediately and practically as a whole deflected or changed into one acting at an angle of 90° thereto, effecting a rotation of the axle 21 on the trunnions 181. Such a torque has, therefore, no further disturbing action on the controlled member and the gyroscope is returned to its original inclination by means of the spring members 28, this latter movement having no appreciable effect on the vertical axle owing to the comparatively great frictional resistance of that axle.

As rotary influences are actually transmitted to an axle when the latter offers substantial friction, it is clear that in the present instrument such rotary influences will be transmitted through the vertical axle while having very little effect on the horizontal trunnions. The gyroscope, may be considered as having one of its degrees of freedom of rotation, namely, about a vertical axis somewhat restricted thereby diminishing its stability to a certain degree. The effect of the earth's rotation, therefore, will be to make the gyroscope, or rather the axle 21, seek its position of equilibrium along the vertical through oscillations on either side of it while remaining practically in a fixed vertical plane, very slight so-called mutational oscillations about this plane being neglected. Owing to the addition of the spring members 28, and to the practically complete freedom of rotation on the trunnions 181, the position of equilibrium of the axle 21 can be made inclined to the vertical. Preferably, it would be made horizontal. Moreover, disturbances due to the turning of the ship carrying such an instrument or to the movement of the ship from one place to another on the surface of the globe, will have no appreciable effect on the indications of the instrument. The turning of a ship is equivalent to an increase or decrease of the vertical component of the earth's angular velocity and, therefore, is taken care of as above explained, while the movement of the ship from one place to another on the surface of the earth can produce only rotational influences about a horizontal axis and, in view of the herein disclosed construction, will have no appreciable effect on the indications of the instrument.

The maximum limit of the torque which may be transmitted through the vertical axle and become gyroscopically effective is predetermined and all other possible disturbing forces are rendered practically ineffective, as hereinbefore set forth.

I claim:—

1. A gyroscope having frictional means to partly suppress freedom of rotation about its vertical axis, and means to neutralize precession about another axis.

2. A gyroscope having frictional means to partly suppress freedom of rotation about its vertical axis, and resilient means to neutralize precession about another axis.

3. A gyroscope having means to partly suppress freedom of rotation about its vertical axis, and means to return, after precession, the gyroscope to its normal position.

4. A gyroscope having means to partly suppress freedom of rotation about its vertical axis, a frame within which said gyroscope is pivotally mounted, and resilient means in connection with said frame adapted to act upon said gyroscope, and a controlled member in connection with said frame.

5. A gyroscope having adjustable frictional means to partly suppress freedom of rotation about one of its axes, and means to neutralize precession about another axis.

6. The combination with a suitably mounted frame, and a substantially counterbalanced gyroscopic member pivotally mounted therein and having means to partly suppress freedom of rotation about its vertical axis; of means to normally maintain the said member in predetermined angular relation to said frame.

7. The combination with a suitably mounted frame and a substantially counterbalanced gyroscopic member pivotally mounted therein; of upper and lower spring members secured to said frame and extending therefrom, and rods extending from said gyroscopic member adapted to engage the respective spring members.

8. The combination with a suitable frame, a gimbal support therefor, a second frame rotatably supported by said first frame, a substantially counterbalanced gyroscopic member pivotally mounted in said second frame, a resilient band secured to said first-named frame and extending about the axle of precession, and means to vary the pressure exerted by said band upon said axle of precession; of upper and lower spring members secured to said second frame and extending therefrom, and rods extending from said gyroscopic member and adapted to engage the respective spring members; and a compass card in connection with said second frame.

9. The combination with a suitably mounted gyroscope and means to partly suppress freedom of rotation about its vertical axis, of resilient means acting on said gyroscope to cause the same to turn about an axis perpendicular to the axis of rotation of said mass, the force exerted thereby being insufficient to effect turning of said gyroscope about the vertical axis due to precession.

Signed at New York, in the county of New York, and State of New York, this 6th day of December, A. D. 1912.

EMIL KLAHN.

Witnesses:
 WILIAM H. COOK,
 DOUGLAS P. COON.